United States Patent
Magai et al.

(10) Patent No.: US 8,416,982 B2
(45) Date of Patent: Apr. 9, 2013

(54) IMAGE PROCESSING APPARATUS, IMAGE PROCESSING METHOD AND PROGRAM

(75) Inventors: Koichi Magai, Tokyo (JP); Hirotaka Shiiyama, Yokohama (JP); Hidetomo Sohma, Yokohama (JP); Masahiro Matsushita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 798 days.

(21) Appl. No.: 12/566,562

(22) Filed: Sep. 24, 2009

(65) Prior Publication Data

US 2010/0074530 A1    Mar. 25, 2010

(30) Foreign Application Priority Data

Sep. 25, 2008   (JP) ................. 2008-246339

(51) Int. Cl.
*G06K 9/00*        (2006.01)
(52) U.S. Cl.
USPC .......................................... 382/100; 382/104
(58) Field of Classification Search .................. 382/100, 382/104
See application file for complete search history.

(56) References Cited

U.S. PATENT DOCUMENTS

| | | | | |
|---|---|---|---|---|
| 5,757,287 A | * | 5/1998 | Kitamura et al. | 340/937 |
| 5,809,161 A | * | 9/1998 | Auty et al. | 382/104 |
| 6,212,287 B1 | * | 4/2001 | Olivieri et al. | 382/104 |
| 6,332,038 B1 | * | 12/2001 | Funayama et al. | 382/190 |
| 2002/0054692 A1 | * | 5/2002 | Suzuki et al. | 382/100 |
| 2004/0146178 A1 | * | 7/2004 | Donescu | 382/100 |
| 2006/0002587 A1 | * | 1/2006 | Takahama et al. | 382/103 |

FOREIGN PATENT DOCUMENTS

| | | |
|---|---|---|
| JP | 9-044665 A | 2/1997 |
| JP | 10-097619 A | 4/1998 |
| JP | 2004-326693A A | 11/2004 |
| JP | 2004-348563 A | 12/2004 |
| JP | 2006-190201A A | 7/2006 |

OTHER PUBLICATIONS

Schmid et al., "Local Grayvalue Invariants for Image Retrieval," IEEE Transactions on Pattern Analysis and Machine Intelligence, vol. 19, May 5, 1997, pp. 530-535.
"Local Greyscale Invariants for Image Retrieval", Cordelia Schmid and Roger Mohr, pp. 1-6, May 1997.

* cited by examiner

*Primary Examiner* — Hadi Akhavannik
(74) *Attorney, Agent, or Firm* — Canon USA, Inc., IP Division

(57) ABSTRACT

An image processing method performs reduction processing on an input image to acquire a reduced image, extracts a feature point from a group of images including the input image and one or more of the reduced images, determines as a matched feature point the feature point extracted from a matching position in each of two or more images in the group of images, calculates a local feature quantity of the matched feature point determined by the determination unit, and registers the calculated local feature quantity as a local feature quantity of the input image.

11 Claims, 6 Drawing Sheets

IMAGE PROCESSING APPARATUS, IMAGE PROCESSING METHOD AND PROGRAM

BACKGROUND OF THE INVENTION

1. Field of the Invention

The present invention relates to an image processing apparatus, an image processing method and a program for extracting a local feature.

2. Description of the Related Art

As described in "C. Schmid and R. Mohr, 'Local gray value invariants for image retrieval' IEEE Trans. PAMI. Vol. 19, No. 5, pp 530-535, 1997", there is a method for searching for a similar image using a local feature quantity acquired by quantifying a local feature of an image. According to this method, firstly, a differential filter such as Sobel and Prewitte is applied to a two-dimensional brightness distribution of the image to extract a feature point included in an edge portion or a corner portion of the image. Next, the feature quantity of the feature point (local feature quantity) is calculated from pixel values of the feature point and pixels located in the vicinity thereof. The image is searched for by matching the local feature quantities with each other.

However, some extracted feature points are not stable enough that they cannot be extracted from the same edge portion or the same corner portion again (low reproducibility) after the image is a little rotated, enlarged or reduced. Such an extracted feature point having the low reproducibility often works as a noise and can deteriorate a search accuracy or a positioning accuracy. Therefore, Japanese Patent Application Laid-Open No. 9-44665 and Scmid discuss a method for providing the threshold for a function value used in extracting the feature point and the pixel value of the feature point candidate and discarding the feature point candidate that shows less than the threshold value.

It is not sufficient to use only the predetermined pixel value and the function value used in extracting the feature point to remove the unstable feature point. Thus, it is necessary to set the threshold value high enough in order to narrow down to the feature point having a high reproducibility, which can be extracted even if the image is variously converted. However, if the threshold value is set too high, only a few feature points are acquired, which can greatly deteriorate the search accuracy and a recognition accuracy.

SUMMARY OF THE INVENTION

The present invention is directed to a method for narrowing down to a feature point having a high reproducibility of extraction.

According to an aspect of the present invention, an image processing apparatus includes a conversion unit configured to perform reduction processing on an input image to acquire a reduced image, an extraction unit configured to extract a feature point from a group of images including the input image and one or more of the reduced images, a determination unit configured to determine as a matched feature point the feature point extracted from a matching position in each of two or more images in the group of images, and a registration unit configured to calculate a local feature quantity of the matched feature point determined by the determination unit and register the calculated local feature quantity as a local feature quantity of the input image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

A feature quantity, a feature point, and a local feature quantity will be described. When an image is specified as a search condition (query image) to search for a similar image, processing for comparing two images (the query image and an image in database (DB)) to each other is performed. When the image is searched, a numeral value or a numeric sequence representing the image in detail is previously calculated as the feature quantity for each image.

As a result of the search, the image having the similar feature quantity is output as the similar image. When the image is searched, a keyword for indicating a content of the image can be used. However, the present specification uses the feature quantity that is calculated from the pixel value of the image and used for the search and the recognition.

In an example where information about a color arrangement is defined as the feature quantity, the feature quantity is acquired by converting the image into a reduced image having 8×8 pixels and associating information about a location of each of the pixels (0, 0) to (8, 8) with a quantified value of a color that appears.

However, it is difficult to search for some images by a search method using the information about the color location. For example, some images may include a different background, a part hidden behind an obstacle, or an enlarged or reduced part.

In such a case, a method for comparing the local features included in the query images may be employed. According to this method, points that can readily match each other are selected from the image. Further, the points are matched between images. The points that can readily match each other are defined as the feature points. According to the present specification, the feature points are extracted from a corner portion or an edge portion in the image.

Figure 1A:
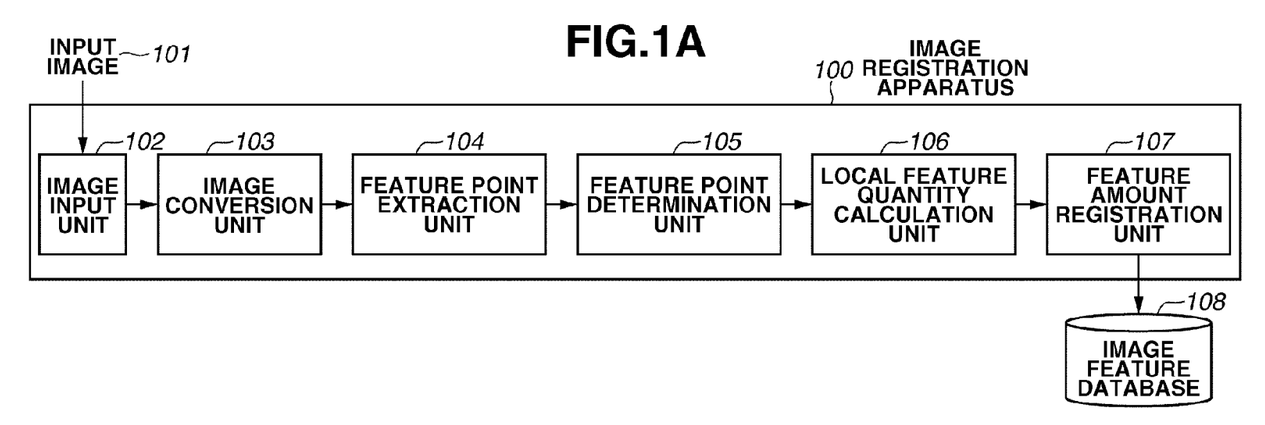
FIGS. 1A and 1B illustrate examples of configurations of an apparatuses according to an exemplary embodiment of the present invention.
Figure 1B:
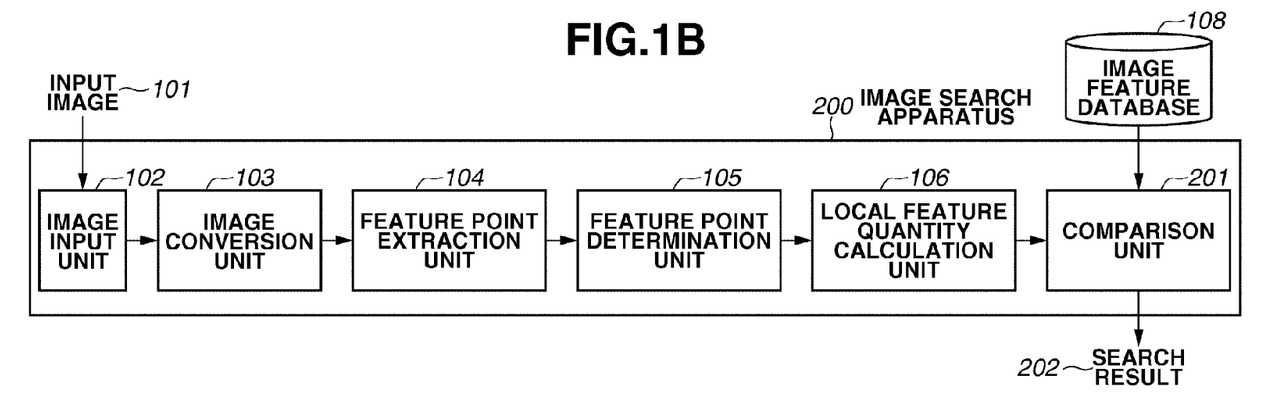

FIGS. 1A and 1B are schematic block diagrams illustrating configurations of functions of an image registration apparatus according to an exemplary embodiment of the present invention. FIG. 1A illustrates the configuration of the function of an image registration apparatus 100, and FIG. 1B illustrates the configuration of the function of an image search apparatus 200.

As illustrated in FIG. 1A, the image registration apparatus 100 includes an image input unit 102, an image conversion unit 103, a feature point extraction unit 104, a feature point determination unit 105, a local feature quantity calculation unit 106 and a feature quantity registration unit 107.

In the image registration apparatus 100, the image conversion unit 103 generates a reduced image (converted image) of an input image 101 input to the image input unit 102. Further, the feature point extraction unit 104 extracts candidates of the feature points from the input image 101 and the reduced image. The feature point determination unit 105 determines the feature points having the high reproducibility of extraction from among the candidates of the extracted feature points by the feature point extraction unit 104 and narrows down to a stable feature point.

The local feature quantity calculation unit 106 calculates the local feature quantity of the feature point narrowed by the feature point determination unit 105. The feature quantity registration unit 107 associates the input image 101 with the calculated local feature quantity and registers the input image 101 and the local feature quantity in the image feature database 108.

Next, the image search apparatus 200 illustrated in FIG. 1B will be described. The unit having the same function as that of the image registration apparatus 100 in FIG. 1A has the same numeral reference. The description of the unit having the same configuration and function will be omitted.

The image search apparatus 200 includes the image input unit 102, the image conversion unit 103, the feature point extraction unit 104, the feature point determination unit 105, the local feature quantity calculation unit 106 and a comparison unit 201.

The comparison unit 201 searches for the image similar to the input image 101 (query image) from the image feature database 108 based on the local feature quantity calculated by the local feature quantity calculation unit 106 and outputs the image as a search result 202.

Next, the local feature quantity regarding each feature point is extracted. Local and Jet acquired by quantifying a pattern in the vicinity of the feature point and derivatives of the Local and the Jet are combined and used as the feature quantity of the local feature quantity.

More specifically, for example, the feature quantity is calculated by the following expression (1).

$$V(x, y) = \begin{pmatrix} L \\ L_x L_x + L_y L_y \\ L_{xx} L_x L_x + 2 L_{xy} L_x L_y + L_{yy} L_y L_y \\ L_{xx} + L_{yy} \\ L_{xx} L_{xx} + 2 L_{xy} L_{xy} + L_{yy} L_{yy} \end{pmatrix} \quad (1)$$

V (x, y) represents the local feature quantity of the feature point positioned at a coordinate (x, y). The coordinate described here refers to a position of the pixel in a digital image. Since the position of the pixel in the digital image is discrete (since it is represented by an integer), it is necessary to convert the coordinate into the integer when the position of the pixel needs to be specified from an actual number coordinate as a calculation result.

According to the exemplary embodiment, when the coordinate can be represented by an actual number value, the position of the pixel is specified by rounding out the actual value to the integer value. A method for rounding out the actual number value includes half adjusting, rounding up after the decimal point, and rounding down after the decimal point. Any method may be selected in the present exemplary embodiment, however, the method should not be changed during the processing.

Reference symbols used in a right hand side of the expression (1) are defined by expressions (2), (3), (4), (5), (6), and (7). "G" (x, y) in the right hand side of the expression (2) represents a gauss function, "I" (x, y) represents the pixel value at a coordinate (x, y) of the image, and "*" represents a reference symbol representing a convolution calculation.

The expression (3) is a partial derivative with respect to "x" of a variable "L" defined by the expression (2). The expression (4) is a partial derivative with respect to "y" of the variable "L". The expression (5) is a partial derivative with respect to "y" of a variable Lx defined by the expression (3). The expression (6) is a partial derivative with respect to "x" of the variable Lx defined by the expression (3). The expression (7) is a partial derivative with respect to "y" of a variable Ly defined by the expression (4).

$$L = G(x, y) * I(x, y) \quad (2)$$

$$L_x = \frac{\partial L}{\partial x} \quad (3)$$

$$L_y = \frac{\partial L}{\partial y} \quad (4)$$

$$L_{xy} = \frac{\partial^2 L}{\partial x \partial y} \quad (5)$$

$$L_{xx} = \frac{\partial^2 L}{\partial x^2} \quad (6)$$

$$L_{yy} = \frac{\partial^2 L}{\partial y^2} \quad (7)$$

Since "G" (x, y) is the gauss function, the "G" normally includes a standard deviation "σ" as a variable, however, it is omitted in the expression (2). According to the present exemplary embodiment, the "σ" is previously determined as σ=ar. The "a" is a constant. The "r" represents a radius of a circular region around the focused feature point which is referred when the local feature quantity of the focused feature point is calculated.

As long as a method can calculate the local feature quantities of the pixel including the feature point and the pixel in the vicinity of the feature point, a different method other than the above-described method may be used. The above-described local feature quantity is made of five components, however, the number of the components does not need to be five. For example, the present invention can be applied to a Scale-Invariant Feature Transform (SIFT) (the number of the components is 128) or a Principal Component Analysis SIFT (PCA-SIFT) (the number of the components is about 20 to 30).

Next, processing for registering the local feature quantity extracted from the image will be described in detail.

Figure 2:
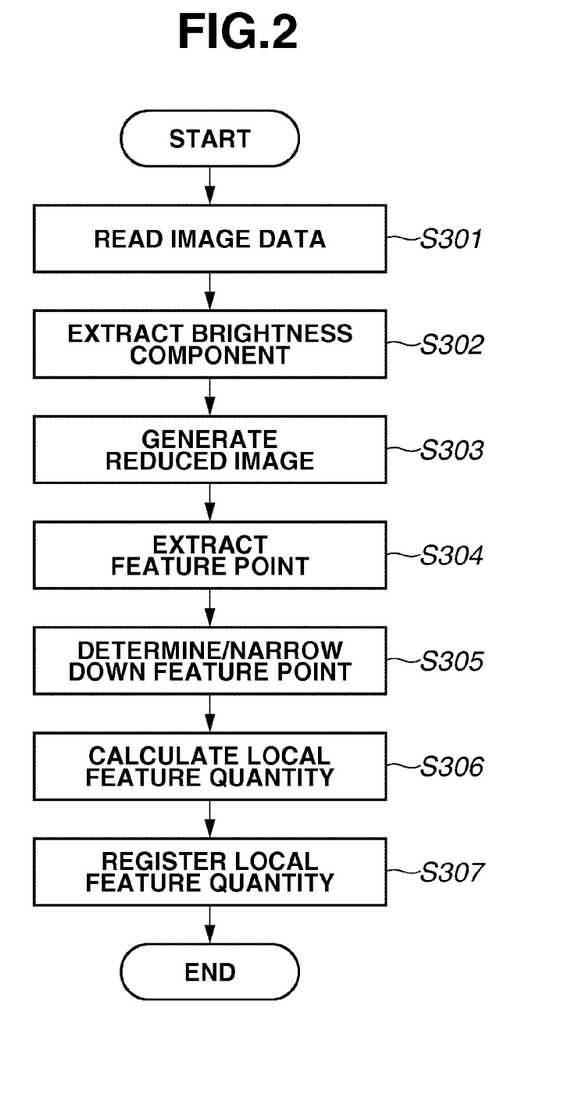
FIG. 2 is a flowchart illustrating processing for registering an image.

FIG. 2 is a flowchart illustrating processing for registering the local feature quantity. In step S301, the image input unit 102 reads the input image 101. In step S302, the image input unit 102 extracts a brightness component (hereafter, referred to as a brightness component image) from the input image 101.

In step S303, the image conversion unit 103 performs a reduction conversion on the brightness component extracted by the image input unit 102 to acquire the brightness component image having "n" types of different resolutions. More specifically, the image conversion unit 103 performs reduction processing on the brightness component image acquired from the image input unit 102 "n" times according to a predetermined reduction rate "p" (conversion rate).

Figure 4:
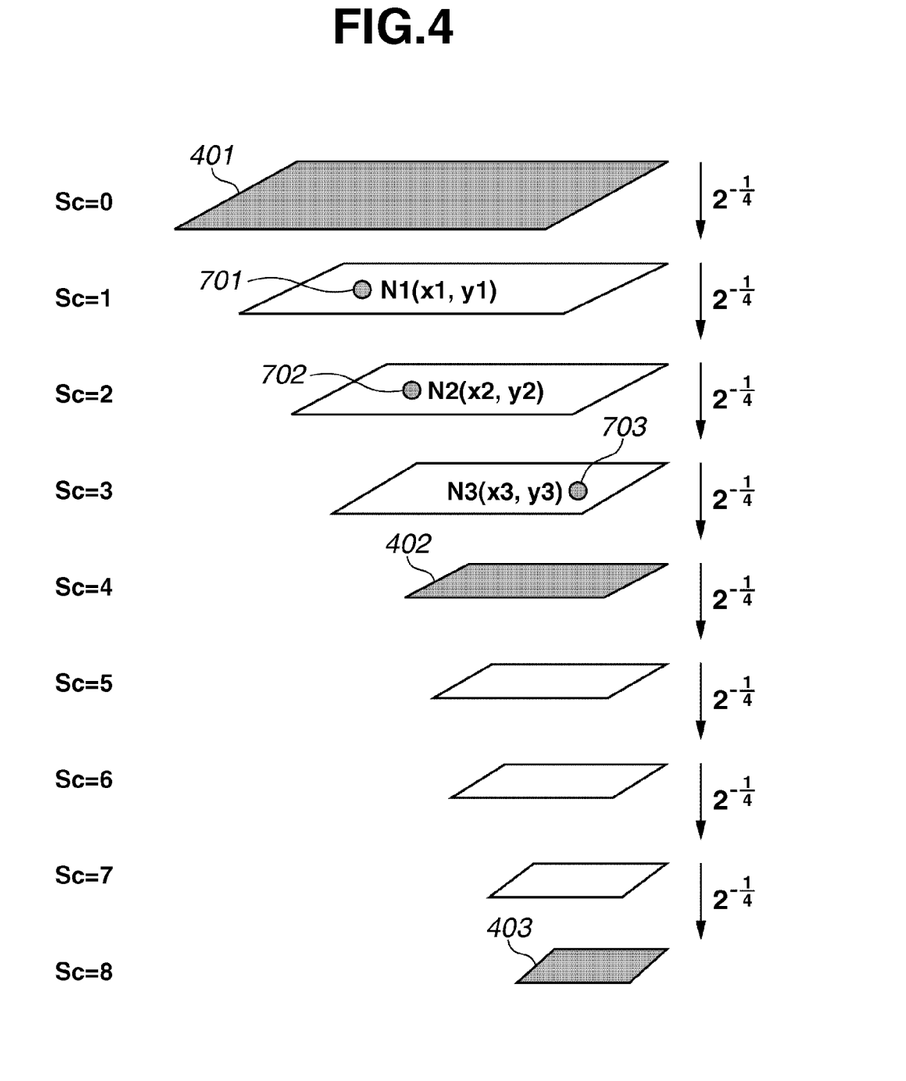
FIG. 4 illustrates an example of an extracted feature point.

The image conversion unit 103 performs reduction conversion "n" times to acquire "n" pieces of reduced images (refer to FIG. 4). The reduction rate "p" and the number of reduction times "n" are previously set. The "n" needs to be an integer equal to 1 or more. It is desirable that the reduction conversion is performed a plurality of times. For example, the number of reduction times for generating 2×2 pixels may be previously calculated and determined.

FIG. 4 illustrates reduction conversion processing performed by the image conversion unit 103. FIG. 4 illustrates a case where the reduction rate "p" is the −(¼) power of two and the number of pieces "n" of the reduction images are eight. In FIG. 4, an image 401 is a brightness component image extracted from the input image 101 by the image input unit 102. An image 402 is a reduced image acquired by reducing the brightness component image four times according to the reduction rate "p". An image 403 is a reduced image acquired by reducing the brightness component image eight times according to the reduction rate "p".

According to this example, the image 402 is the image acquired by reducing by ½ the brightness component image 401 extracted by the image input unit 102. The image 403 is the image acquired by reducing by ¼ the brightness component image 401.

In the present example, the reduction conversion is performed on the image using linear interpolation, however, another method such as simply thinning the pixel or sampling the pixel after applying a low pass filter may also be employed.

Next, in step S304, the feature point extraction unit 104 extracts the candidates of the feature points from the brightness component of the input image 401 and the brightness components of the images having "n" types of resolutions on which the reduction conversion is performed by the image conversion unit 103.

Firstly, the feature point extraction unit 104 performs a Harris operator on the input image 101 (401) and the image converted by the image conversion unit 103. With respect to the output image acquired by performing the Harris operator, a pixel value of a focused pixel and pixel values of eight pixels surrounding the focused pixel (nine pixels in total) are compared to each other. A point having the maximum pixel value among nine pixels and equal to or more than the threshold value is extracted as the feature point.

In step S305, the feature point determination unit 105 performs processing for narrowing down to the stable feature point by determining whether the candidates of the feature points extracted by the feature point extraction unit 104 are stable.

Firstly, the feature point determination unit 105 converts all coordinates of the feature points extracted by the feature point extraction unit 104 into the coordinates of the input images before the images are converted. Next, the feature point determination unit 105 determines whether the feature point extracted by the feature point extraction unit 104 exists at a matching coordinate on or in the vicinity of the coordinate of other reduced images reduction-converted by the image conversion unit 103 in step S303. At this point, the feature point that exists is employed as a matched feature point, and the local feature quantity at the matched feature point is calculated.

An area of the vicinity can be freely determined. According to the present exemplary embodiment, the area is determined within two pixels' distance from the focused feature point. If the extracted feature point has a stable feature, the feature point will be also extracted in the vicinity of the reduced image.

Further, when the coordinate of the feature point is converted into the coordinate of the input image, the feature point and the input image should have the same coordinate theoretically. However, since a rounding error appears in the digital image, considering the error, the vicinity is defined as the area within two pixels' distance from the focused feature point.

Step S305 will be described in detail using FIGS. 4 and 5.

FIG. 4 illustrates an example of the extracted feature point in which the candidates of the feature points extracted by the feature point extraction unit 104 in step S304 are superimposed on the reduced image generated by the image conversion unit 103 in step S303.

In FIG. 4, a scale number Sc represents the number of times of converting the image (here, the number of times of reduction) by the image conversion unit 103. According to a first exemplary embodiment, the Sc represents the scale number of the reduced image. When the scale number is Sc and the reduction rate is "p", a size of the reduced image is acquired by multiplying a size of the input image (an image when Sc=0) by the (Sc)th power of "p". For example, when the reduction rate "p" is the −(¼) power of two and Sc=4, the size of the reduced image is ½.

A feature point 701 is one of the feature points extracted by the feature point extraction unit 104 from the reduced image of the scale number Sc=1. The coordinate of the feature point 701 is defined as N1 (x1, y1) on the reduced image of Sc=1. A feature point 702 is one of the feature points extracted by the feature point extraction unit 104 from the reduced image of the scale number Sc=2. The coordinate of the feature point 702 is defined as N2 (x2, y2) on the reduced image of Sc=2. A feature point 703 is one of the feature points extracted by the feature point extraction unit 104 from the reduced image of the scale number Sc=3. The coordinate of the feature point 703 is defined as N3 (x3, y3) on the reduced image of Sc=3.

Figure 5:
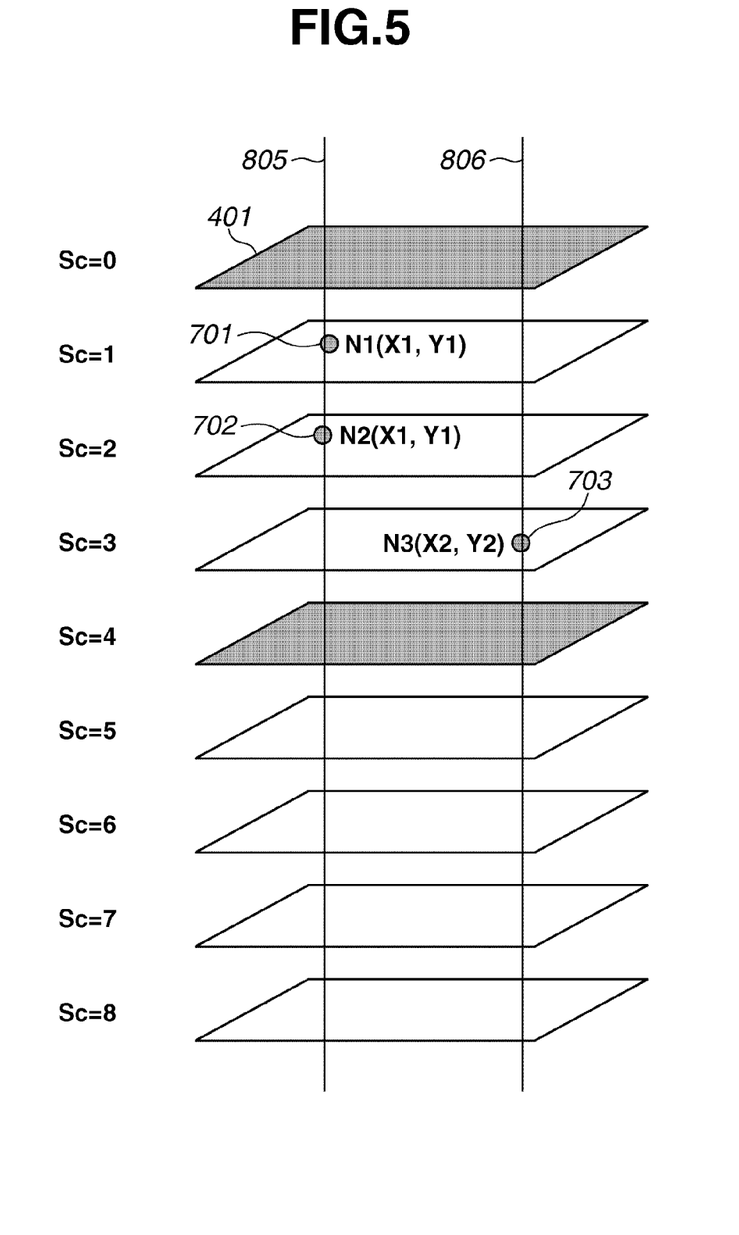
FIG. 5 illustrates a method for determining a matched feature point.

FIG. 5 are diagrams acquired by converting the coordinate system of reduced images (Sc=1, 2, 3, 4, 5, 6, 7, and 8) illustrated in FIG. 4 into the coordinate system of the scale number Sc=0 with lined up images.

Suppose that the feature point 702 is focused in step S305, where the N1 (x1, y1) is firstly acquired. By converting the coordinate, the coordinate N1 (X1, Y1) of the feature point 702 in the coordinate system of Sc=0 is calculated from the N1 (x1, y1) of the feature point 702.

Subsequently, with respect to the feature points of the reduced images other than the images of Sc=1 extracted by the feature point extraction unit 104, the coordinates of the feature points converted into the coordinate system Sc=0 are calculated and it is determined whether the coordinates are positioned at the same coordinate as the coordinate N1 (X1, Y1) of the feature point 701 or in the vicinity thereof. According to the present exemplary embodiment, as a result of converting the coordinate N2 (x2, y2) of the feature point 702 into the coordinate system of Sc=0, the coordinate N2 (X1, Y1) is acquired.

In this case, the converted coordinate N1 (X1, Y1) of the feature point 701 and the converted coordinate N2 (X1, Y1) of the feature point 702 match each other and are coordinates before and after the reduction conversion is performed, respectively. Thus, it is known that the N1 and the N2 are the matched feature points. Even if the N1 and the N2 do not match each other, when the N1 and the N2 are the feature points extracted from different images and the N1 is positioned at a distance less than a predetermined distance from the N2 in the image 401, the N1 and the N2 may be defined as the matched feature points located at matching positions.

The distance maybe set larger when the feature points extracted from the image are reduced more times. Alternatively, the distance may be previously set. Further alternatively, according to the number of the candidates of the feature points extracted from step S304, as the larger number of the candidates is acquired, the predetermined area may be set smaller. If the smaller number of the candidates is acquired, the predetermined area may be set larger.

On the other hand, when a feature point 703 in a reduced image of Sc=3 is brought into focus, the feature point that matches the feature point 703 does not exist in the image other than the image of Sc=3. Therefore, the feature point 703 is not the matched feature point.

In step S305, the above-described processing is performed on each of the feature points extracted by the feature point extraction unit 104.

In step S306, the local feature quantity calculation unit 106 calculates the local feature quantity for each of the feature points extracted by the feature point extraction unit 104 using the expression (1).

In step S307, the feature quantity registration unit 107 associates the local feature quantity calculated by the local feature quantity calculation unit 106 with the input image 101 and registers the local feature quantity and the input image 101 in the image feature database 108.

Additionally, similar to the feature points 701 and 702 illustrated in FIG. 5, the only local feature quantities of the matched feature points located at matching positions that are extracted from the images reduced successive times (the feature point 701 is reduced once, the feature point 702 two times) may be registered. The feature points determined as the matched feature points based on the reduced image that is reduced successive times similar to the feature points 701 and 702, are highly likely to be extracted from the same edge portions or the same corner portions.

Further, when the local feature quantities are calculated from the feature points 701 and 702 determined as the matched feature points, it is desirable that the local feature quantity is calculated from each of the feature point 701 and the feature point 702 and associated with each of the feature points. Only one of the feature points 701 and 702 may be selected to calculate the local feature quantity.

The extracted local feature quantity here is associated with position information of the feature point and transmitted to the feature quantity registration unit 107.

There are various methods for extracting the local feature quantity. One method is assigning an orientation for each feature point based on an inclination of a distribution of an image value or an inclination orientation in the two-dimensional alignment. As long as a method can calculate the local feature quantity of the feature point, not only the method for calculating the feature quantity as described above but also other methods can be employed.

Further, in step S305, an upper limit to the number of matched feature points to be employed may be provided. By providing the upper limitation, a processing speed can be improved. When the upper limitation is provided, by selecting the feature points in order from the larger reduction rate, the feature points extracted from the low-pass areas are preferentially sorted out, thereby more stable feature points can be sorted out.

Next, an operation of each unit for searching for the image will be described.

Figure 3:
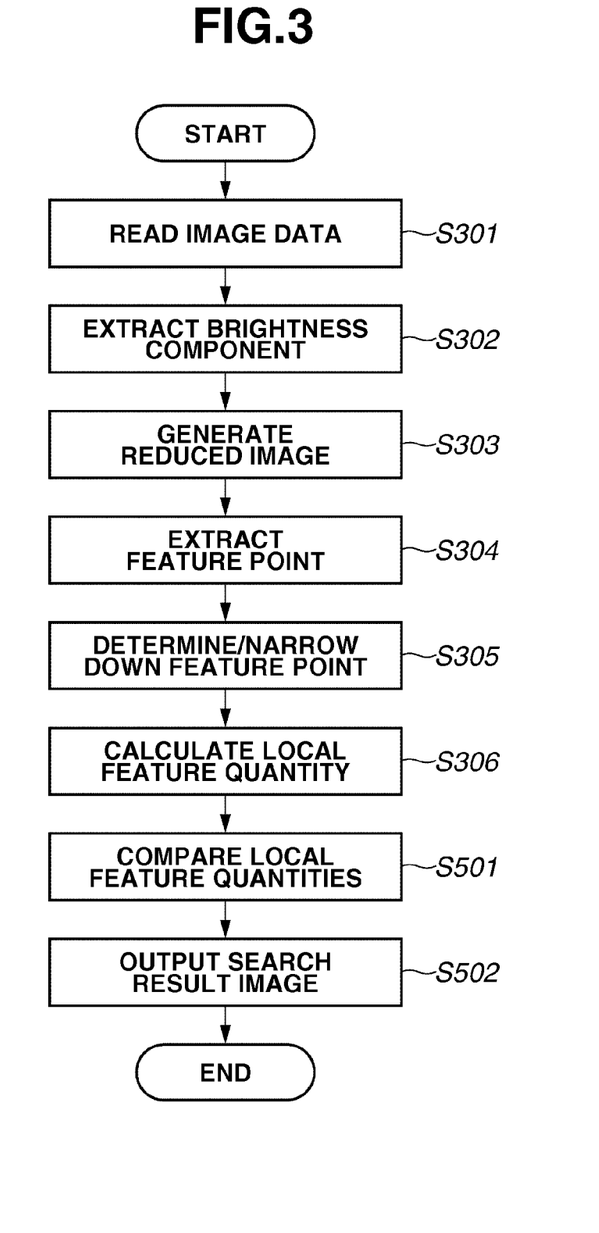
FIG. 3 is a flowchart illustrating processing for searching for the image.

FIG. 3 is a flowchart illustrating processing by the image search apparatus 200 for searching for the image. The processing illustrated in FIG. 3 having the same function as that in FIG. 2 has a same reference numeral as that in FIG. 2, and a description will be omitted.

In step S501, the comparison unit 201 compares the local feature quantity extracted from the input image 101 by the local feature quantity calculation unit 106 to the local feature quantity registered in the image feature database 108. This comparison processing is performed on each input image registered in the image feature database 108, and a similarity level is calculated for each input image as a result of the comparison processing.

Next, in step S502, the comparison unit 201 outputs the similarity level as the search result 202. As the search result 202, for example, the calculated similarity and the image from which the similarity is calculated can be associated with each other and listed in order from the higher similarity. Further, it is desirable that the search results are output in a thumbnail view.

In order to describe a method for calculating the similarity, firstly, a method for comparing the local feature quantity will be described. The local feature quantity included in the expression (1) for calculating the local feature quantity was expressed by a numeric sequence including five elements. However, numbers other than five maybe used. Since the numeric sequence including a plurality of elements expresses a vector in a multiple-dimensional space, the similarity can be determined by comparing two vectors.

For example, according to the present exemplary embodiment, a difference vector is calculated from the two vectors to be compared. If the difference vector has the smaller absolute value, it is determined that the similarity is higher. Additionally, if an angle between the two vectors is smaller, it may be determined that the similarity is higher. Alternatively, these similarities may be dealt with in combination.

As described above, according to the present exemplary embodiment, the feature points extracted from the matching coordinates in a plurality of reduced images are acquired as the matched feature points, and the local feature quantity of each matched feature point is calculated to perform the search processing.

The matched feature point is extracted when the reduction conversion is performed and has stability with a high reproducibility. Therefore, the feature points having noises (unstable feature points) are decreased, thereby improving the search accuracy and decreasing troublesome works in the processing.

The above-described exemplary embodiment employs the reduction conversion for converting the image, however, the present invention can be applied to other various image conversions.

For example, an enlargement conversion can be performed to convert the image using an enlargement rate as a predetermined conversion rate, so that the search accuracy can be improved for an enlarged image. A rotation conversion can be performed to convert the image using a rotation rate as the predetermined conversion rate, so that the search accuracy can be improved for a rotated image.

Additionally, blurring processing (convolution using a gauss filter) can be performed to convert the image using a conversion rate of a standard deviation "σ" of the gauss filter as the predetermined conversion rate to acquire a blurred image, so that the search accuracy can be improved for the image having an added noise.

The processing of adding the noise for converting the image is performed using an addition level of the noise as the predetermined conversion rate so that the search accuracy can be improved for the image having the added noise. Further, the above-described various image conversions may be used in combination.

The exemplary embodiment describes the image search as an example, however the present invention is not limited to the image search but can be applied to the image processing such as recognition for extracting the feature point from the input image and calculating the local feature quantity.

Figure 6:
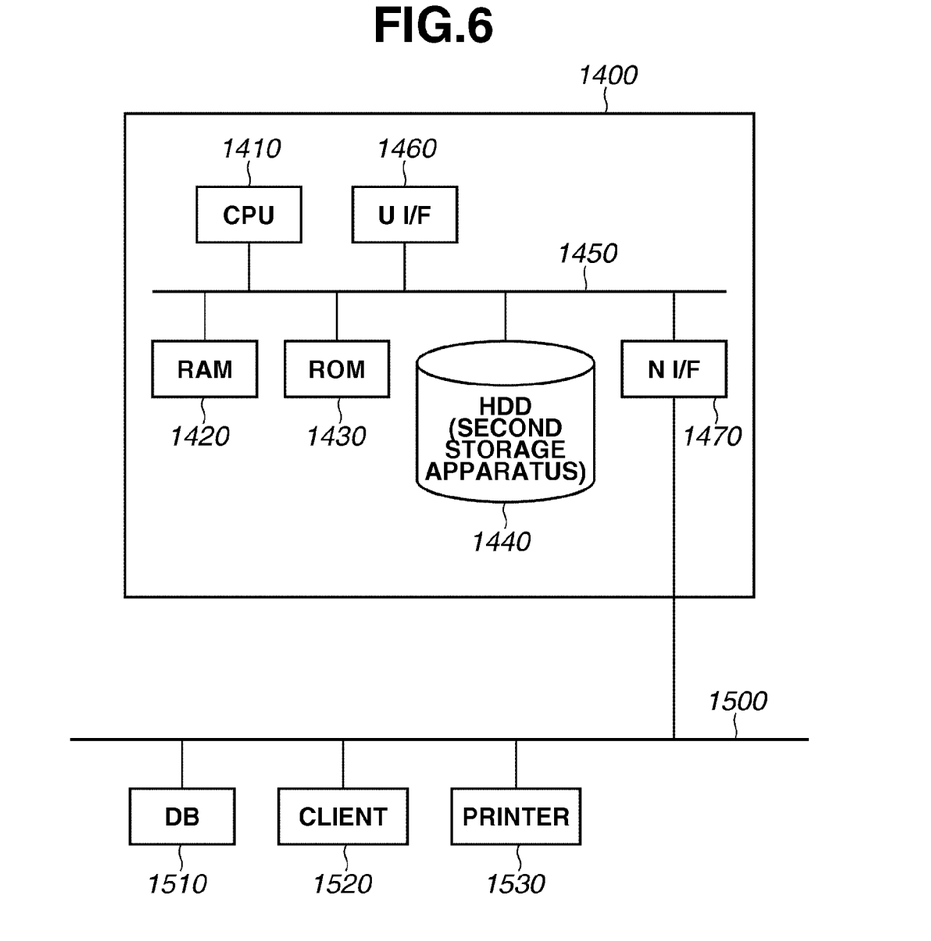
FIG. 6 is a schematic diagram illustrating a configuration of a hardware according to the exemplary embodiment of the present invention.

The present invention is realized by supplying to the system or the apparatus a computer-readable storage medium storing a program that causes a computer as illustrated in FIG. 6 to execute the processing according to the above-described exemplary embodiment.

A computer 1400 illustrated in FIG. 6 stores in a Read Only Memory (ROM) 1430 a program that causes a Central Processing Unit (CPU) 1410 to realize the processing of the flowchart according to the above-described exemplary embodiment. When the program is executed, the computer 1400 reads out the program stored in the ROM 1430 to a Random Access Memory (RAM) 1420 to cause the CPU 1410 to perform the processing.

A bus 1450 transmits/receives data in the ROM 1430, the RAM 1420, the CPU 1410, and a hard disk (HDD). Further, the computer 1400 receives an input from an input/output device such as a keyboard or a mouse connected to a user interface. Furthermore, the computer 1400 inputs/outputs to/from a network interface 1470. The network interface 1470 of the computer 1400 can communicate with a database (DB) 1510, a client (CLIENT) 1520, and a printer (PRINTER) 1530 via the network 1500.

Moreover, a plurality of hardware and software may cooperate to realize the exemplary embodiment described above. For example, a part of the configurations illustrated in FIGS. 1A and 1B can be realized by the softwares or an integrated circuit (IC) specified for specific processing.

Additionally, a plurality of devices connected via the network may be used in combination to realize the exemplary embodiment. Referring to FIG. 6 as an example, the computer 1400 receives the image from the printer 1530 or the client 1520, performs the processing of the flowchart illustrated in FIG. 2, and registers the processed image in the database 1510.

Further, the computer 1400 receives a search request and the query image from the client 1520 or the printer 1530, perform the processing of the flowchart of FIG. 3, and searches the image similar to the query image from the database 1510.

Furthermore, the program read from the computer-readable storage medium is written to a function extension unit inserted into the computer, and the CPU included in the function extension unit may perform the processing based on an instruction of a program code.

Moreover, as the computer-readable storage medium for supplying the program code, a flexible disk, the hard disk, an optical disk, an optical magnetic disk, the Compact Disk ROM (CD-ROM), a CD Recordable (CD-R), a magnetic tape, a non-volatile memory card, and the ROM can be used.

Further, the CPU reads the program code and uses the function of an operating system (OS) running on the computer to perform the processing described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-246339 filed Sep. 25, 2008, which is hereby incorporated by reference herein in its entirety.

What is claimed is:

1. An image processing apparatus configured to receive a plurality of input images, the image processing apparatus comprising:

a conversion unit configured to perform reduction processing on an input image to generate at least one reduced image;

an extraction unit configured to extract feature points from a group of images including the input image and the reduced image;

a determination unit configured to determine at least one stable feature point from among the feature points extracted by the extraction unit in each of two or more images from the group of images, the stable feature point being located at a position of matched feature points within a predetermined distance that are extracted from each of said two or more images from the group of images;

a registration unit configured to register a local feature quantity of the stable feature point determined by the determination unit in association with the input image; and a decision unit configured to decide the predetermined distance based on a number of the stable feature points.

2. The image processing apparatus according to claim 1, wherein the determination unit is further configured:

to extract a coordinate of the feature points from each image of the group of images;

to convert the coordinate of the feature points into a coordinate of any one of the group of images; and to determine a coordinate of the stable feature point by extracting a combination of two or more feature points with coordinates within a predetermined distance from each other.

3. The image processing apparatus according to claim 1, wherein the registration unit is configured to register only the local feature quantity of the second stable feature point.

4. The image processing apparatus according to claim 1, further comprising:

a storage unit configured to store a plurality of target images and the local feature quantity of the plurality of target images; and a comparison unit configured to compare the local feature quantity with respect to the first input image with local feature quantities stored in the storage unit.

5. The image processing apparatus according to claim 4, further comprising:

a search unit configure to search for the local feature quantities in the plurality of target images that are similar to the local feature quantity of the first input image in the storage unit using a result by the comparison unit.

6. The image processing apparatus according to claim 1, wherein the registration unit is configured to register only the local feature quantity of the stable feature point extracted from an input image reduced many times by the conversion unit.

7. An image processing method for processing a plurality of input images, the method comprising:

performing reduction processing on an input image to generate at least one reduced image;

extracting feature points from a group of images including the input image and the reduced image;

determining at least one stable feature point from among the feature points extracted by the extracting step in each of two or more images from the group of images, the stable feature point being located at a position of matched feature points within a predetermined distance that are extracted from each of said two or more images from the group of images;

registering a local feature quantity of the stable feature point determined by the determining step in association with the input image; and deciding the predetermined distance based on a number of the stable feature points.

8. A non-transitory computer-readable storage medium storing a program that, when run on a computer, causes the computer to execute a method for processing a plurality of input images, the method comprising:

performing reduction processing on an input image to generate at least one reduced image;

extracting feature points from a group of images including the input image and the reduced image;

determining at least one stable feature point from among the feature points extracted by the extracting step in each of two or more images from the group of images, the stable feature point being located at a position of matched feature points within a predetermined distance that are extracted from each of said two or more images from the group of images;

registering a local feature quantity of the stable feature point determined by the determining step in association with the input image; and deciding the predetermined distance based on a number of the stable feature points.

9. The image processing apparatus according to claim 2, wherein the predetermined distance is larger as feature points extracted from images reduced a larger number of times are compared.

10. The image forming apparatus according to claim 1, wherein the registration unit preferentially registers stable feature points extracted from successive reduced images.

11. An image processing apparatus configured to receive a plurality of input images, the image processing apparatus comprising:

a conversion unit configured to perform reduction processing on an input image to generate at least one reduced image;

an extraction unit configured to extract feature points from a group of images including the input image and the reduced image;

a determination unit configured to determine at least one stable feature point from among the feature points extracted by the extraction unit in each of two or more images from the group of images, the stable feature point being located at a position of matched feature points within a predetermined distance that are extracted from each of said two or more images from the group of images; and a registration unit configured to register a local feature quantity of the stable feature point determined by the determination unit in association with the input image, wherein the predetermined distance is larger as feature points extracted from images reduced a larger number of times are compared.

* * * * *